United States Patent [19]

Kopytko

[11] Patent Number: 5,241,004
[45] Date of Patent: Aug. 31, 1993

[54] SHEET AND MOLDED OBJECT FROM A THERMOPLASTIC MATERIAL BASED ON POLYURETHANES

[75] Inventor: Walter Kopytko, Hannover, Fed. Rep. of Germany

[73] Assignee: J. H. Benecke AG, Hannover, Fed. Rep. of Germany

[21] Appl. No.: 955,279

[22] Filed: Oct. 1, 1992

[30] Foreign Application Priority Data

Apr. 4, 1992 [DE] Fed. Rep. of Germany ....... 4211414

[51] Int. Cl.$^5$ .............................................. C08L 75/04
[52] U.S. Cl. ..................................... 525/123; 525/125
[58] Field of Search ................................ 525/123, 125

[56] References Cited

U.S. PATENT DOCUMENTS 4,347,338  8/1982  Torii et al. .......................... 525/123

Primary Examiner—Maurice J. Welsh
Attorney, Agent, or Firm—Darby & Darby

[57] ABSTRACT

A sheet or a molded object is described, which is made of a thermoplastic material comprising a polyurethane, a modified polymer and, optionally, conventional additives. This thermoplastic material thus comprises component A in the form of the thermoplastic polyurethane, the polyvinyl acetate in the form of polyvinyl acetate as well as, as flow modifier, the component C in the form of a further thermoplastic material, an elastomer-modified thermoplastic material or a rubber or combinations thereof. This material has about 10 to 35 parts by weight of polyvinyl acetate and about 1 to 50 parts by weight of component C per about 100 parts by weight of component A. The material advantageously shows an improved melt strength. When this material is calendered, no interfering sticking effects occur.

19 Claims, No Drawings

SHEET AND MOLDED OBJECT FROM A THERMOPLASTIC MATERIAL BASED ON POLYURETHANES

FIELD OF THE INVENTION

The invention relates to a sheet and a molded object made from a thermoplastic material based on polyurethanes, also comprising at least one further modifying polymer or elastomer or combinations thereof and, optionally, comprising further additives.

BACKGROUND OF THE INVENTION

A sheet of the type of the present invention is disclosed by German Auslegeschrift 40 18 716. It is manufactured using a rubber-elastic mixture of special Shore A hardness of less than 85 which can be processed thermoplastically, and contains a thermoplastic polyurethane elastomer (TPU) and an ethylene/vinyl acetate copolymer (EVA). The vinyl acetate (VA) content of the EVA is taught to be between 78 and 95% by weight. In the rubber-elastic mixture there should be 50 to 99% by weight of TPU and 1 to 50% by weight of EVA, wherein the sum of the percentages is equal to 100%. The mixture is used to produce molded objects and sheets which are soft and elastic, and are readily processed (that is, without sticking), yet they also have a high strength, a good elongation at break, a high abrasion resistance, and show little swelling in fuels and lubricants.

The VA content of the EVA materials which are presently commercially available is of the order of 40 percent by weight. These materials can be calendered. If such an EVA is used in a thermally-processible mixture in accordance with the information of the German Auslegeschrift 40 18 716, the resulting mixture cannot readily be processed into sheets by calendering because the melt strength is too low. Moreover, calendering of this mixture results in a sheet with unacceptable sticking qualities.

It is therefore an object of the invention to develop an improved thermoplastic material having the desirable properties of the material of German Auslegeschrift 40 18 716, as well as having the capability of being processed into sheets, for example, by calendering.

SUMMARY OF THE INVENTION

According to the present invention, a thermoplastic material more easily processed is produced by the use of a pure polyvinyl acetate in place of EVA in the compositions of the prior art. The processing qualities are also improved by the addition of a flow modifier to the thermoplastic material composition. Therefore, the thermoplastic material of the present invention comprises, in addition to component A, a thermoplastic polyurethane, and component B, a polyvinyl acetate, a component C, a flow modifier in the form of a further thermoplastic material, such as an elastomer-modified thermoplastic material or a rubber or mixtures thereof. There is about 10 to 35 parts by weight of component B and about 1 to 50 parts by weight of component C per about 100 parts by weight of component A.

DETAILED DESCRIPTION OF THE INVENTION

Within the scope of the invention, the concept "thermoplastic material" shall have the widest possible meaning. It is to include, for example, mixtures of thermoplastic synthetic resins, polymer blends, polymer alloys or graft copolymers and similar compositions. Within the scope of the invention, thermoplastic polyurethane can be used, including the thermoplastic polyurethanes which are described in the German Auslegeschrift 40 18 716, that is, the products which are described as "TPU" in this Auslegeschrift. Preferred conventional thermoplastic polyurethanes, as well as of those with elastomeric properties, are those which contain as polyols, either linear polyether diols or linear polyether diols, and those which contain polyester diols or slightly branched polyhydroxy compounds having a functionality of at least 2. For calendering, extruding, and similar treatments, thermoplastic polyether-polyester polyurethanes or mixtures thereof have proven to be particularly advantageous. These predominantly aliphatic, aromatic, or combinations thereof of polyether-polyester polyurethanes are derived preferably from hexamethylene glycol (hexamethylene ether), from polyesters of adipic acid and butylene glycol, or from isophorone diisocyanate and hexylene glycol. The polyurethanes are polycondensed and can be subsequently compounded in a suitable mixer to the desired alloys or mixtures. For about 40 to 60 percent by weight of ether, about 60 to 30 percent by weight of ester is required, in addition to about 10 to 20 percent by weight of urethane. It is advantageous to mix or alloy the TPU, described above, with various other aliphatic, aliphatic, or aromatic TPUs or combinations thereof.

The present invention deviates from the above-described state of the art in that, within the scope of the invention, pure polyvinyl acetate is used instead of EVA. Preferably, this has a Kraemer-Sarnow-Nagel softening range between 92° and 220° C., that is, for example, between 92° and 94° C. or between 195° C. and 201° C., and a K value according to DIN 53 726 (1% acetone at +20° C.) from about 40 to 120.

Essential to optimizing the properties of the inventive sheet or molded object is the inclusion of the above-described component C in the form of a thermoplastic modifier, an elastomer-modified thermoplastic material or a rubber or combinations thereof. The modifier serves to adjust the melt strength and melt viscosity, the tenacity, the ability to calender the material, the ability to extrude the material and other similar properties. It can, however, also adversely effect the resistance to chemicals and solvents, the wetting properties, and the ability to glue or weld the material. In some cases, the miscibility and compatibility of the individual components in the multiphase system must also be considered when designing the compositions. However, these relationships are well known to those of ordinary skill so such adjustments would not require an undue amount of experimentation, especially given the quantitative and qualitative guidelines of the present disclosure. Through the well-directed choice of modifier, a whole series of molding compositions with the desired properties can be produced, such as a high elongation at break, a high abrasion resistance, and low swelling in fuels and lubricants. Rubber-like modifiers can additionally serve as internal or external plasticizers, while hard thermoplastic materials are suitable as internal or external reinforcing components.

The thermoplastic modifier also affects the flow and processing properties. For calendering, thermoplastic materials with a softening range of 152° to 210° C. and a melt index (235° C./1 kg) of 1 to 7 g/10 minutes are preferred. For extrusion, thermoplastic materials with a melt index of 1.5 to 15 g/10 minutes are particularly suitable. Particularly preferred are fuel- and mineral oil-resistant thermoplastic materials, such as nylon 6, nylon 12, nylon 66, nylon 69, polyether block amides, polyacrylonitriles, or other such resistant materials well known in the prior art. If a nylon material is selected, then those which have a mass average molecular weight (MW) of more than 18,000 and an elongation at break of at least 150% are preferred. Additionally, the materials are preferably filled with hydrophobic fillers, such as silica, potassium aluminum silicate, calcium carbonate or other fillers well known in the prior art. The addition of fillers improves, for example, the calendering properties of nylon 6, as well as its resistance to the action of oils, fats, fuels, and other such solvents.

Component C can also be an elastomer-modified thermoplastic material. According to the present invention, the concept of "elastomer modified thermoplastic material" includes a plurality of compounds. Preferably an elastomer-modified styrene copolymer is used as the elastomer-modified thermoplastic material, particularly an elastomer-modified styrene-acrylonitrile (SAN) copolymer. Of these, rubber-grafted SAN copolymers, which are grafted with an acrylate ester or ethylene-propylene diene monomer (EDPM) rubber, are preferred. Further, particularly suitable elastomer-modified styrene copolymers are styrene-ethylene-butadiene (hydrogenated) styrene or styrene-ethylene-propylene block copolymers and combination thereof. Furthermore, polycaprolactone, ethylene-vinyl acetate copolymers, polyvinyl acetate or ethylene-vinyl acetate-carbon monoxide terpolymer and combinations thereof are also suitable.

Component C can also be a rubber, a pre-cross-linked rubber or combinations thereof. In particular, rubbers which are resistant to the effect of fuel and oil, such as an acrylonitrile-butadiene copolymer (NBR), an NBR containing carboxyl groups, a fluorinated rubber (FKM), CO-epichlorohydrin homopolymers or copolymers, or their mixtures are preferred. If a NBR or a NBR containing carboxyl groups is used, then the preferred types are those which are pre-cross-linked and have a Mooney value (ML 1+4 at 100° C.) of 38 to 88 and a higher acrylonitrile content of about 30 to 50%, preferably of about 38 to 45%. The thermoplastic modifier C can be a nylon, an acrylonitrile/methyl methacrylate copolymer, a polycarbonate, a polypropylene, a polypropylene functionalized with maleic anhydride, a polycarbonate, a polyether block amide, or other similar thermoplastic compounds.

Beyond the qualitative requirements mentioned with respect to the components A, B, and C, component C must also fulfill the already described basic quantitative conditions to accomplish the objective of this invention. For every approximately 100 parts by weight of component A, there must be about 10 to 35 parts by weight of component B as well as about 1 to 50 parts by weight of component C. It is preferred if, for about every 100 parts by weight of component A, there are about 15 to 35 of component B and about 3 to 35 parts by weight of component C.

In order to undertake an extensive optimization within the scope of the present invention, the components A, B and C should be selected so that they exhibit little if any swelling in fuels and lubricants, with the result that the finished product has optimum properties.

The properties of the thermoplastic synthetic resin sheet, of the composite sheet produced therewith, and also of the thermoplastic molded article can be modified by different additives, which are incorporated in the thermoplastic material. Examples of materials which can be added are fillers, such as calcined (preferably hydrophobized) silica, potassium aluminum silicates, French chalk, calcium carbonate, metal oxides (preferably titanium oxide), various metal powders, or furnace blacks (such as conductive furnace black); lubricants, such as $C_{12}$ to $C_{26}$ fatty acids, fatty alcohols, fatty acid esters or fatty acid amides or mixtures of these; dyes, such as organic dyes or pigments (such as phthalocyanines or furnace black); stabilizers, such as antioxidants; heat stabilizers, such as sterically hindered phenols, hydroquinones, substituted representatives of this group, phosphites, phosphonites or mixtures of these; stabilizers, particularly UV stabilizers, such as various low molecular weight but also low molecular weight resorcinols, salicylates, benzotriazoles or benzophenones or mixture of these; as well as other conventional modifiers well known to those of ordinary skill. Various processing aids (PMMA, high molecular weight), delustering agents (PMMA-silica mixture), antistatic agents, flame retardants, which lower the flammability of the sheet (examples of which are hydrophobized magnesium hydroxide, ammonium polyphosphate and other similar compound well known in the prior art) can also be enlisted as additives. These additives can be admixed with the required components A, B and C in conventional mixers, such as kneaders, continuous one-shaft kneaders, one- or two-shaft mixing extruders, or other well known apparatus. The sheet or molded object can be produced from this homogenized starting mixture in the conventional manner, for example, by means of conventional calendering techniques, in suitable extruders and melt casting equipment and also by injection molding.

The advantage associated with the invention over the present state of the art described herein, is the higher melt strength of the synthetic resin. Additionally, there are also no interfering sticking effects during calendering.

The invention is described in even greater detail in the following by means of examples. However, the scope of the present invention is not to be limited to the embodiments discussed.

Examples 1 to 3

A basic sheet, about 0.8 mm thick, was produced with a 4-roll calender using the formulations given in the Table. The various properties of this sheet were measured and the results of the measurements are also given in the Table.

Raw Materials for the Formulations of Examples 1 to 3

---

A1 (TPU-1): linear, aromatic TPU based on polyester diol (adipate ester), methylene diisocyanate and 1,4-butylene glycol Properties:

| | |
|---|---|
| melt index (MFI) = 2.5 g/10 min (190° C./10 kg) | (DIN 53735) |
| hardness = 85–90 Shore A | (DIN 53505) |
| elongation at break = 600% | (DIN 52910) |
| modulus of elasticity (at 300% extension) = 12 MPa | (DIN 52910) |

A2 (TPU-2): linear, aliphatic TPU based on hexamethylene ether, polyester synthesized from adipic acid, butylene glycol, isophorone diisocyanate and -continued hexylene glycol, with an ether:ester:urethane
ratio of 60:30:10

Properties:

| | |
|---|---|
| MFI = 1.5-4 g/10 minutes (190° C./10 kg) | (DIN 53735) |
| hardness = 80-85 Shore A | (DIN 53505) |
| elongation at break = 420% | (DIN 52910) |

B (Polyvinyl Acetate):

Properties:

softening range (Kraemer-Sarnow-Nagel method): 209°-211° C.
K value (1% in acetone at +20° C.) (DIN 53523): 90 ± 3
C1 (ASA): 40%; AN: 18%; rubber: 45%

Properties:

| | |
|---|---|
| Mooney viscosity (ML 1 + 4/100° C.): 50 | (DIN 53523) |
| Tb (determined with DSC): −10° C. | |

C2 (Polyether Block Amide):

Properties:

| | |
|---|---|
| MFI = 4 ± 2 g/10 min (235° C./1 kg) | (DIN 53735) |
| hardness: 69 Shore D | (DIN 53505) |
| elongation at break: 380% | (DIN 52910) |

C3 (NBR rubber, pre-cross linked):

Properties:

| | |
|---|---|
| Mooney viscosity (ML 1 + 4/100° C.) | (DIN 53523) |
| ACN content: 42% | |

TABLE

| | Example | | |
|---|---|---|---|
| Formulations | 1 (parts by weight) | 2 (parts by weight) | 3 (parts by weight) |
| A1: TPU-1 (linear aromatic polyester) | 77 | 50 | 70 |
| A2: TPU-2 (linear aliphatic polyether/polyester) | 23 | 50 | 30 |
| B: Polyvinyl acetate | 12 | 15 | 12 |
| C1: ASA | 12 | — | — |
| C2: Polyether block amide | — | — | 12 |
| C3: Pre-cross linked NBR rubber | — | 10 | — |
| Filler: hydrophobized calcium carbonate | 10 | 10 | 10 |
| Lubricant: ethyl nonacosanoate | 0.4 | 0.4 | 0.4 |
| Carbon black (conductive) | 5 | 5 | 5 |
| Delustering agent: mixture of PMMA/silica | 3 | 3 | 3 |
| Processing aid: high molecular weight PMMA | 1.5 | 1.5 | 1.5 |
| Properties | | | |
| Elongation at break (DIN 52910) (%) | 561 | 524 | 579 |
| Tensile strength (DIN 52910) (MPa) | 23 | 24 | 20 |
| Modulus of elasticity (DIN 52910) (MPa) | 23 | 20 | 29 |

What is claimed is:

1. A sheet or molded object of a thermoplastic material comprising a thermoplastic polyurethane, a polyvinyl acetate, and a component selected from the group consisting of an additional thermoplastic material, an elastomer-modified thermoplastic material, a rubber, and combinations thereof, said material comprising about 10 to 35 parts by weight of said polyvinyl acetate and about 1 to 50 parts by weight of said component per 100 parts by weight of said thermoplastic polyurethane.

2. The sheet or molded object of claim 1, said material comprising about 15 to 35 parts by weight of said polyvinyl acetate and about 3 to 25 parts by weight of said component per 100 parts of said thermoplastic polyurethane.

3. The sheet or molded object of claim 1, said component comprising a nylon.

4. The sheet or molded object of claim 2, said component comprising a nylon.

5. The sheet or molded object of claim 1, said component comprising an elastomer-modified thermoplastic material.

6. The sheet or molded object of claim 5, said elastomer-modified thermoplastic material comprising an elastomer-modified styrene copolymer.

7. The sheet molded object of claim 6, said elastomer-modified styrene copolymer comprising an elastomer-modified styrene-acrylonitrile (SAN) copolymer.

8. The sheet or molded object of claim 2, said component comprising an elastomer-modified thermoplastic material.

9. The sheet or molded object of claim 8, said elastomer-modified thermoplastic material comprising an elastomer-modified styrene copolymer.

10. The sheet or molded object of claim 9, said elastomer-modified styrene copolymer comprising an elastomer-modified styrene-acrylonitrile (SAN) copolymer.

11. The sheet or molded object of claim 1, said component comprising a rubber.

12. The sheet or molded object of claim 11, said rubber comprising an acrylonitrile-rich NBR with an acrylonitrile content of about 30 to 50%.

13. The sheet or molded object of claim 2, said component comprising a rubber.

14. The sheet or molded object of claim 13, said rubber comprising an acrylonitrile-rich NBR with an acrylonitrile content of about 30 to 50%.

15. The sheet or molded object of claim 1, said polyvinyl acetate having a Kraemer-Sarnow-Nagel softening range between about 92° and 200° C. and a DIN 53 726 K value (1% in acetone at +20° C.) of about 40 to 120.

16. The sheet or molded object of claim 1, said thermoplastic polyurethane comprising a polyol component.

17. The sheet or molded object of claim 16, said polyol component selected from the group consisting of a linear polyether diol and a linear polyether diol/linear polyester diol mixture.

18. The sheet or molded object of claim 1, said component comprising a polyether block amide.

19. A thermoplastic material comprising a thermoplastic polyurethane, a polyvinyl acetate, and a component selected from the group consisting of an additional thermoplastic material, an elastomer-modified thermoplastic material, a rubber and combinations thereof, said material comprising about 10 to 35 parts by weight of said polyvinyl acetate and about 1 to 50 parts by weight of said component per 100 parts by weight of said thermoplastic polyurethane.

* * * * *